United States Patent [19]
Stratis et al.

[11] Patent Number: 5,953,669
[45] Date of Patent: Sep. 14, 1999

[54] METHOD AND APPARATUS FOR PREDICTING SIGNAL CHARACTERISTICS IN A WIRELESS COMMUNICATION SYSTEM

[75] Inventors: Glafkos Stratis, Chicago; Julian Mendoza, Elgin; Javier Mendoza, Bartlett; Veeraraghavan A. Anantha, Des Plaines, all of Ill.

[73] Assignee: Motorola, Inc., Schaumburg, Ill.

[21] Appl. No.: 08/988,434

[22] Filed: Dec. 11, 1997

[51] Int. Cl.⁶ .................................................. H04B 17/02
[52] U.S. Cl. ......................... 455/449; 455/524; 455/67.3; 455/67.6; 455/446
[58] Field of Search ..................................... 455/446, 449, 455/524, 67.1, 67.3, 67.6, 422, 423, 40; 364/514; 395/200.56

[56] References Cited

U.S. PATENT DOCUMENTS

| | | | |
|---|---|---|---|
| 5,301,127 | 4/1994 | Hitney | 455/40 |
| 5,491,644 | 2/1996 | Pickering et al. | 455/524 |
| 5,561,841 | 10/1996 | Markus | 455/422 |
| 5,689,812 | 11/1997 | Takahashi | 455/67.6 |

OTHER PUBLICATIONS

Netplan™ RF System Planning and Management Tool brochure, published by Motorola, Inc., 1996.
"Integrated Macro and Microcellular Propagation Model, Based on the Use of Photogrammetric Terrain and Building Data," by E.K. Tameh et al., IEEE (1997), pp. 1957–1961.
"A Versatile Wave Propagation Model for the VHF/UHF Range Considering Three–Dimensional Terrain," by M. Lebherz et al., IEEE Transactions on Antennas and Propagation, vol. 40, No. 10, Oct. 1992, pp. 1121–1131.
"Two–Dimensional Ray–Tracing Modeling for Propagation Prediction in Microcellular Environments," K. Rizik et al., IEEE Transactions on Vehicular Technology, vol. 46, No. 2, May 1997, pp. 508–517.
"Simulation of Radio RayRelay Link Performance Using a Deterministic 3D Wave Propagation Model," by N. Geng et al., Radio Relay Systems, C11–14 Oct. 1993, Conference Publication No. 386, IEE, pp. 343–348.
Concepts and Results for 3D Digital Terrain–Based Wave Propagation Models: An Overview, T. Kürner et al., IEEE Journal on Selected Areas in Communications, vol. 11, No. 7, Sep. 1993.
"Finite–Difference Time–Domain Method for Electromagnetic Radiation, Interference, and Interaction with Complex Structures," P.A. Tirkas et al., IEEE Transactions on Electromagnetic Compatibility, vol. 35, No. 2, May 1993.
"A Microcellular Communications Propagation Model Based on the Uniform Theory of Diffraction and Multiple Image Theory," S.Y. Tan et al., IEEE Transaction on Antennas and Propagation, vol. 44, No. 10, Oct. 1996.
"A Monte Carlo FDTD Technique for Rough Surface Scattering," J.B. Schneider et al., IEEE Transactions on Antennas and Propagation, vol. 43, No. 11, Nov. 1995.

*Primary Examiner*—Reinhard J. Eisenzopf
*Assistant Examiner*—Lester G. Kincaid
*Attorney, Agent, or Firm*—Heather L. Creps

[57] ABSTRACT

The apparatus includes a memory for storing representations of a microcellular transmitter and a macrocellular transmitter. The representation of the microcellular transmitter is configured to transmit a representation of a first signal, the representation of the macrocellular transmitter is configured to transmit a representation of a second signal. A database is responsive to the memory. The database has a plurality of data structures, and the plurality of data structures comprise a map of a geographic area. A predetermined location is positioned on the map. A facet having a size and comprising at least three points defining a plane is associated with the predetermined location. First and second instruction sets are available to calculate a characteristic of the first and second signals. A processor responsive to the memory and the database uses one of the first instruction set and the second instruction set to calculate the characteristic at the predetermined location.

20 Claims, 3 Drawing Sheets

METHOD AND APPARATUS FOR PREDICTING SIGNAL CHARACTERISTICS IN A WIRELESS COMMUNICATION SYSTEM

FIELD OF THE INVENTION

This invention relates generally to communication systems, and, more particularly, to a method and apparatus for predicting signal characteristics in a wireless communication system.

BACKGROUND OF THE INVENTION

Microcells, which are usually small, low-power radio base stations having small coverage areas, may be used to provide wireless communications in localized areas. Microcells may be coupled to larger base stations, or macrocells, through digital radio transmission or optical fibers. A typical cell site, either a microcell or a macrocell, includes one or more transceivers and a transmitter such as an antenna, and supplies communication services to subscribers within a designated coverage area of the cell site.

Designing a communication system which includes both microcells and macrocells requires selecting geographic locations of transmitters, their desired coverage areas and their signal radiation patterns, so that specific frequencies, such as radio frequencies (RFs), are present within each cell's designated coverage area, while interference with other coverage areas sharing the same or similar frequencies is minimized.

Prediction of actual signal propagation patterns into and out of cells may be difficult, however, because buildings and other terrain irregularities may reflect signals in unanticipated directions, resulting in insufficient signal strength in a one cell's designated coverage area and/or unacceptable levels of interference in another cell's coverage area.

Several software tools are available which predict signal propagation paths and aid in planning the physical layout of a wireless communication system. Examples of such tools include, but are not limited to, Motorola's Netplan™ RF system planning and management tool, Mobile Systems, Inc.'s PlaNet™ RF coverage tool, LNS's RF planning tool and a commercially available raytracing tool developed by T. Rappaport. Currently, however, these and other software tools may not be suitable for use in planning all types of communication systems.

First, environmental models or high-resolution maps which model, typically via information stored in a database, areas of interest within a geographic area associated with the communication system and are used to predict signal characteristics at a particular location are different for macrocells than for microcells. For example, macrocellular maps typically require less resolution (or variable layers of resolution) than microcellular maps, which typically are modeled using high resolution databases.

Second, simplistic pathloss equations and empirical, or statistical, propagation models, are generally used in connection with predicting signal characteristics, such as signal strength, associated with macrocells; while for microcells more sophisticated ray tracing techniques, or deterministic models, are used to predict signal characteristics such as actual signal propagation paths. In general, databases associated with macrocellular propagation models are in different coordinate systems and/or formats than databases associated with microcellular propagation models.

Although possible, it may be time consuming and expensive to manually select and field test different combinations of frequencies, signal radiation patterns and/or signal powers to obtain complete coverage and acceptable interference levels for each cell in a communication system which includes both microcells and macrocells.

There is therefore a need for a method and apparatus for predicting signal characteristics in a communication system having both microcells and macrocells which integrates maps having different resolutions into a single map having a single coordinate system, and which adaptively adjusts the prediction of signal characteristics based on the location of a particular point of interest.

SUMMARY OF THE INVENTION

According to an aspect of the present invention, the foregoing need is addressed by a method for predicting a characteristic of first and second signals at a predetermined location within a geographic area, which operates in a wireless communication system serving the geographic area, the wireless communication system including the first transmitter and he second transmitter, the first transmitter a microcellular transmitter configured to transmit a first signal having a first wavelength and the second transmitter a macrocellular transmitter configured to transmit a second signal having a second wavelength. The method includes positioning representations of the first and second transmitters; defining an environmental model of the geographic area; defining a plurality of facets within the environmental model, each of the plurality of facets comprising at least three points defining a plane and having a size, at least one facet associated with the predetermined location; providing a first technique for predicting the characteristic; providing a second technique for predicting the characteristic; based on the size of the at least one facet associated with the predetermined location, on the first wavelength and the second wavelength, using one of the first technique and the second technique to predict the characteristic at the predetermined location; and based on the prediction, modifying a parameter associated with the wireless communication system.

According to another aspect of the present invention, in a wireless communication system serving a geographic area, an apparatus for calculating a characteristic of a first signal and a second signal at a predetermined location within the geographic area includes a memory for storing representations of a microcellular transmitter and a macrocellular transmitter. The representation of the microcellular transmitter is configured to transmit a representation of the first signal and the representation of the macrocellular transmitter is configured to transmit a representation of the second signal. A database is responsive to the memory. The database has a plurality of data structures, and the plurality of data structures comprise a map of the geographic area. The predetermined location is positioned on the map. A facet is associated with the predetermined location. The facet has a size and comprises at least three points defining a plane. A first instruction set for calculating the characteristic and a second instruction set for calculating the characteristic are provided. A processor is responsive to the memory and the database, and the processor uses one of the first instruction set and the second instruction set to calculate the characteristic at the predetermined location.

According to a further aspect of the present invention, in a wireless communication system serving a geographic area, the wireless communication system including a first transmitter and a second transmitter, the first transmitter a microcellular transmitter configured to transmit a first signal and the second transmitter a macrocellular transmitter configured to transmit a second signal, an apparatus for determining a characteristic of the first and second signals at a predetermined location within the geographic area includes means for positioning representations of the first and second transmitters; means for defining an environmental model of the geographic area; means for defining a plurality of facets within the environmental model, each of the plurality of facets comprising at least three points defining a plane and having a size, at least one facet associated with the predetermined location; first means for predicting the characteristic; second means for predicting the characteristic; and means for selecting one of the first means for predicting and the second means for predicting to determine the characteristic at the predetermined location, the selection based on the size of the at least one facet associated with the predetermined location and based on a wavelength of the first and second signals.

Advantages of the present invention will become readily apparent to those skilled in the art from the following description of the preferred embodiment(s) of the invention which have been shown and described by way of illustration. As will be realized, the invention is capable of other and different embodiments, and its details are capable of modifications in various respects. Accordingly, the drawings and description are to be regarded as illustrative in nature, and not as restrictive.

DETAILED DESCRIPTION OF THE PREFERRED EMBODIMENTS

Figure 1:
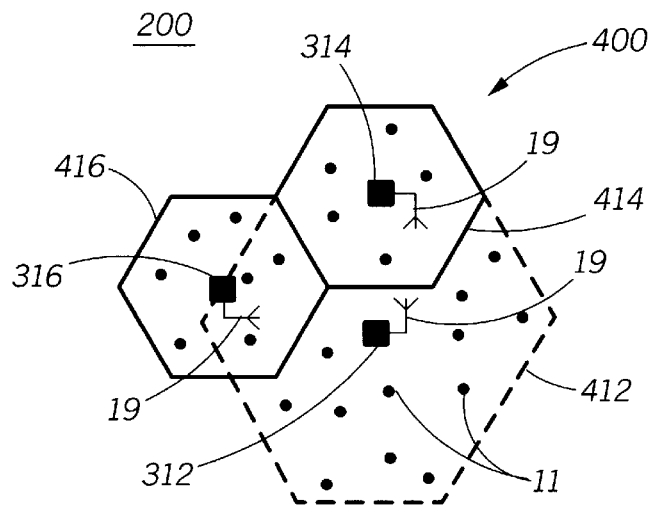
FIG. 1 is a diagram of a typical cellular communication system including both macrocells and microcells.

Turning now to the drawings, wherein like numerals designate like components, FIG. 1 is a diagram of a typical cellular communication system 200. A number of mobile communication units (not shown), or mobile stations, may operate in areas 412, 414 or 416 served by base stations 312, 314 and 316, respectively. Base stations 314 and 316, along with corresponding areas 414 and 416, respectively, are microcells, while base station 312 and corresponding area 412 is a macrocell. Collectively, service areas 412, 414 and 416 cover a particular geographic area 400.

A number of points 11, or measurable regions, which may in fact represent areas of particular sizes or centers of specified areas in space, are shown within geographic area 400. Points 11 may be located anywhere within area 400. Any number of points 11 may be identified within area 400, and it may be assumed that mobile stations operate at points 11. Neighboring service areas 412, 414 and 416 may be overlapping (as shown) or substantially adjacent to each other. It is contemplated that base stations 312, 314 and 316 may be sectors of a sectored base station (not shown), or may themselves be sectored base stations, but in general are devices having transmitters such as antennae capable of emitting radio signals throughout an area over which communication is to be established. Wherever radio frequency channels are referred to herein, such channels are understood to refer to channels in code-based radio-frequency communication systems, as well as channels in frequency-based systems.

A base station such as base station 312, 314 or 316, which is commercially available from Motorola, Inc., may include, among other things, a plurality of transceivers (not shown) which provide communication channels for communication between mobile communication units and base stations 312, 314 and 316, and may also include a transmitter such as an antenna 19 which transmits and receives communication signals. Multiple frequencies, for example, multiple voice and signaling channels, may be transmitted from a single antenna 19, using well-known combining methods. Antennae 19 may be any type, for example, directional-beam, uni-beam, omni-beam, patch or array, and its transmit power and/or phasing may be controlled using various well-known techniques.

One or more of base stations 312, 314 and 316 may be in communication with a base station controller (not shown), such as a Motorola base station controller, having a well-known structure and function, or may itself be a complete base station system. Additional base stations may also be coupled to the base station controller, when present. The base station controller or base station system may in turn be in communication with a switch (not shown), which may be a mobile switching center such as an EMX™ 2500, commercially available from Motorola, or another suitable type of switch. Additional base station controllers (not shown) or base station systems may also be coupled to the switch. The switch may be in further communication with, among other things, a public switched telephone network (PSTN) (not shown), allowing mobile communication units to access land-based communication lines and vice versa.

Multiple access wireless communication between base stations 312, 314 and 316 and mobile stations preferably occurs over radio frequency (RF) channels which provide physical paths over which communication signals such as voice, data and video are transmitted. Base-to-mobile station communications are said to occur on a forward-link channel, while mobile-to-base station communications are referred to as being on a reverse-link channel. A communication channel may be, among other things, a pilot channel, a paging channel, a synch channel, a traffic channel or part of a traffic channel.

When planning a wireless communication system such as system 200 depicted in FIG. 1, it is critical to properly select the geographic locations of base stations 312, 314 and 316 and the approximate boundaries of coverage areas 412, 414 and 416 so that suitable signals, such as radio frequency signals, propagate from antennae 19 to most every point in desired coverage areas 412, 414 and 416 without causing undue interference in the form of adjacent channel or cochannel interference. General considerations involved in designing a wireless communication system such as a cellular radiotelephone network are described in "The Communications Handbook," Jerry D. Gibson, Editor-in-Chief, CRC Press (1997), Chapter 81, pp. 1146–1159, incorporated herein by reference.

If characteristics of signals transmitted from antennae 19 can be accurately predicted, it is likely that base stations 312, 314 and 316 will be properly located. As is well-known, signal characteristics, and thus shapes and sizes of coverage areas 412, 414 and 416 may, in addition to being dependent on the location of buildings and other terrain irregularities, vary as a function of availability of sites to place antennae 19 and traffic congestion.

Figure 2:
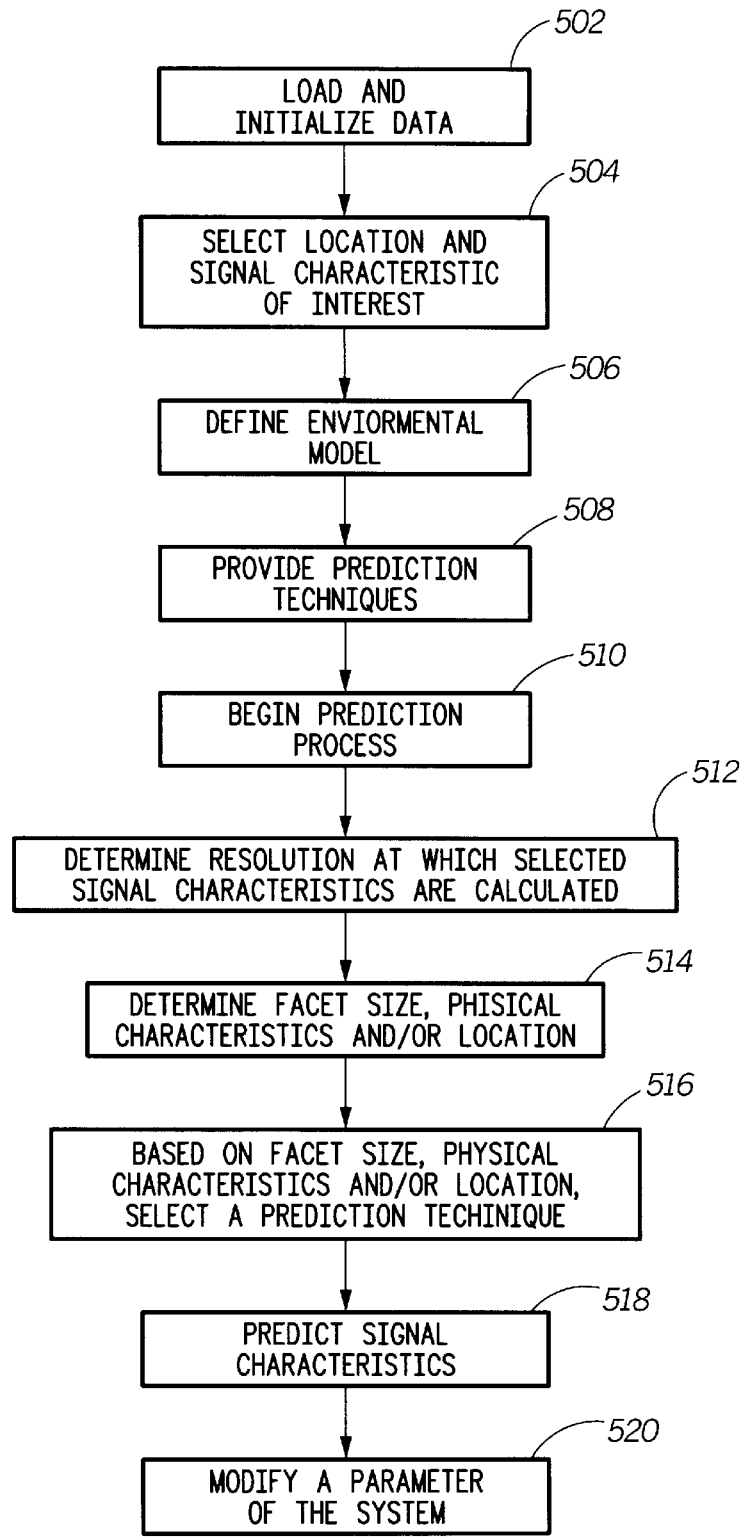
FIG. 2 is a flowchart of a method for predicting signal characteristics according to a preferred embodiment of the present invention.

According to one aspect of the present invention, a method, a flowchart of which is illustrated in FIG. 2 (and further described with reference to FIG. 1 and other figures as necessary), provides for predicting signal characteristics in a wireless communication system such as system 200 having both macrocells and microcells and mixed resolution databases, so that, among other things, desirable signal characteristics associated with each base station 312, 314 and 316 exist at points 11.

At block 502, the step of loading and initializing data is performed. This step may include, among other things, representing base stations 312, 314 and 316 in machine-readable format and selecting initial geographic locations of the representations of base stations 312, 314 and 316, along with approximations of coverage areas 412, 414 and 416 based on different attenuation levels. An initial set of transmit power values associated with antennae 19 of base stations 312, 314 and 316 and particular frequencies of signals transmitted by antennae 19 may also be assumed. For example, cellular radiotelephones currently operate in the 890 MHz range and also in the 1.9 GHz range, although other frequencies may be specified. If there is an object in the near-field of a particular antenna, then a library of antenna patterns may be used which has been pre-generated using a numerical method such as finite difference time domain (FDTD) or finite element method (FEM).

The method continues at block 504, where one or more areas of interest, or a predetermined locations, are selected. For example, one or more points 11 may constitute an area of interest. One or more signal characteristics of interest may also be selected at block 504. Examples of signal characteristics include, but are not limited to, signal strength, signal propagation path, signal interference and signal polarization.

Figure 3:
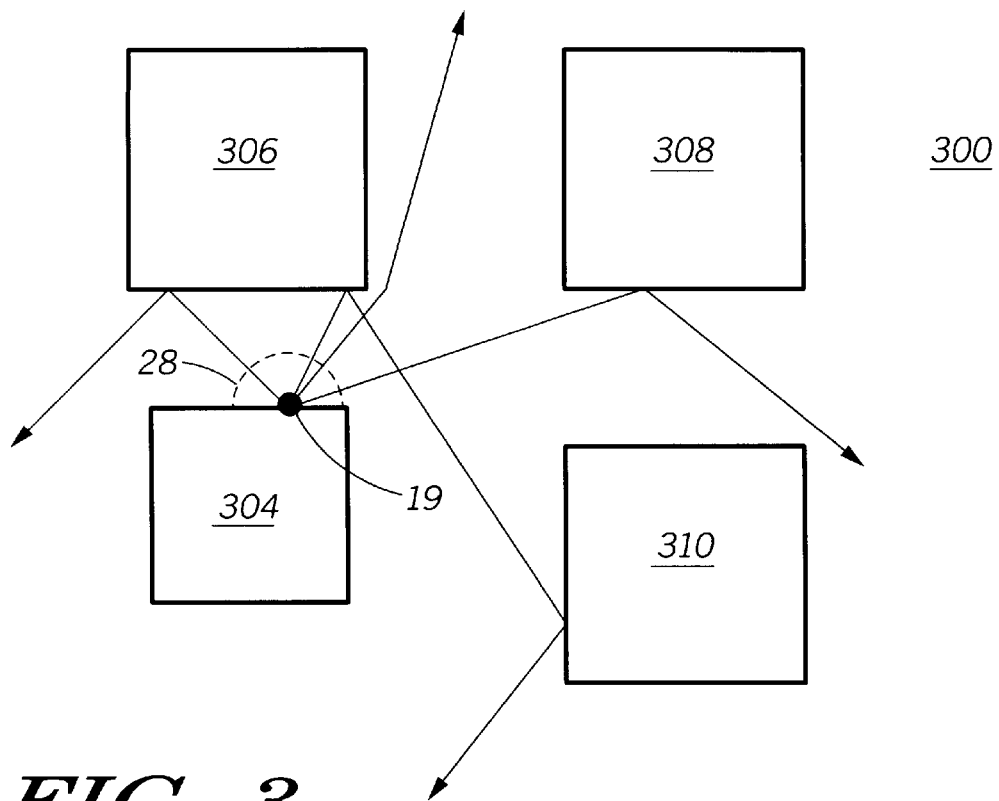
FIG. 3 is a top view of an environmental model which illustrates how buildings and other terrain irregularities may reflect antennae beam patterns in various directions.

Next, at block 506, an environmental model, or map, of geographic area 200 is defined. An example of an environmental model 300 is shown in FIG. 3. As shown, objects which can redirect a propagating signal, including but not limited to buildings 304, 306, 308 and 310, are located in relation to an antenna 19, which may be associated with one of base stations 312, 314 or 316. Location, size and composition of objects such as buildings, terrain elevation and natural objects such as trees, water and rocks may be modeled in three-dimensions and stored in a database. Diffraction, reflection and diffusion scattering coefficients in 3 dimensions of various objects such as known surfaces and inhomogeneous rough surfaces are preferably developed using numerical methods such as finite difference time domain (FDTD) analysis or finite element analysis—different materials are modeled with scattering coefficients, which are in turn used to predict characteristics of reflected or diffracted signals. FDTD and/or other numerical methods may also be used to develop realistic antenna patterns which include the effects of walls, wedge shapes and corners when they exist in the near field of an antenna. Certain permitivities or dielectric properties of an object being modeled may be assumed, and coefficients may be extracted using a supercomputer. These coefficients may then be stored, for future use, as data structures in a database. For example the extracted coefficients may be stored in a well-known format such as a lookup-table.

One approach to three-dimensional modeling is described in "Integrated Macro and Microcellular Propagation Model, Based on the Use of Photogrammetric Terrain and Building Data," by E. K. Tameh et al., IEEE (1997), pp. 1957–1961, incorporated by reference herein. A propagation model for coverage prediction in the very high frequency and ultra high frequency ranges which considers uses a three-dimensional terrain data bank is presented in "A Versatile Wave Propagation Model for the VHF/UHF Range Considering Three-Dimensional Terrain," by M. Lebherz et al., IEEE Transactions on Antennas and Propagation, Vol. 40, No. 10, October 1992, pp. 1121–1131, incorporated herein by reference. Other articles concerning propagation and/or environmental models include: "Two-Dimensional Ray-Tracing Modeling for Propagation Prediction in Microcellular Environments," K. Rizik et al., IEEE Transactions on Vehicular Technology, Vol. 46, No. 2, May 1997, pp. 508–517; "Simulation of Radio Relay Link Performance Using a Deterministic 3D Wave Propagation Model," by N. Geng et al., Radio Relay Systems, C11–14 October 1993, Conference Publication No. 386, IEEE, pp. 343–348; Concepts and Results for 3D Digital Terrain-Based Wave Propagation Models: An Overview," T. Kürner et al., IEEE Journal on Selected Areas in Communications, Vol. 11, No. 7, September 1993; "Finite-Difference Time-Domain Method for Electromagnetic Radiation, Interference, and Interaction with Complex Structures," P. A. Tirkas et al., IEEE Transactions on Electromagnetic Compatibility, Vol. 35, No. 2, May 1993; "A Microcellular Communications Propagation Model Based on the Uniform Theory of Diffraction and Multiple Image Theory," S. Y. Tan et al., IEEE Transactions on Antennas and Propagation, Vol. 44, No. 10, October 1996; and "A Monte Carlo FDTD Technique for Rough Surface Scattering," J. B. Schneider et al., IEEE Transactions on Antennas and Propagation, Vol. 43, No. 11, November 1995. Each of these articles is incorporated herein by reference.

Preferably, environmental model 300 accomodates different resolutions for different regions within geographic area 200. For example, in a rural flat area a resolution of 100–200 meters may be adequate, while a 10 meter or better resolution may be required in an urban area or areas having irregular terrain. It is desirable to achieve such a non-homogeneous map while retaining a single coordinate system. Data collected through various means such as satellite, maps and aerial photographs, among other means, are generally represented in an ellipsoid coordinate system or a spherical coordinate system. It is preferable to transform the ellipsoid coordinate system into a rectangular coordinate system and to use only rectangular (Cartesian) coordinate physics.

Geographical data is preferably separated and classified into rural, urban and mixed areas. Rural areas are further classified based on land cover and elevation. Examples of land cover include forests (having a certain density of trees per area), lakes, open dry lands and open wetlands. Examples of elevation include flat areas, flat areas having particular irregularities or roughness, hilly areas and mountainous terrain. Urban areas may be classified based on building density, defined, for example, by typical U.S. cities, European cities and suburban areas. Each class of data may be assigned its own reflection coefficient and/or diffusion coefficient, and transition regions may also be defined.

At block 508, prediction techniques are provided which simulate the redirection, that is, the reflection, diffraction or diffusion, of a signal 28 within environmental model 300. A first technique for predicting a characteristic of signal 28 transmitted from one or more antennae 19 is a deterministic technique, which includes the use of mathematical formulas, such as three-dimensional scattering calculations, which describe physical phenomena. The use of such calculations is commonly referred to as raytracing. Typically, the underlying calculations are based on the uniform theory of diffraction or geometrical/physical optics, that include plane wave equations characteristics, described in the rectangular coordinate system.

According to a preferred embodiment of the present invention, energy radiated from an antenna is treated as energy density, i.e., watts per square meter. Such radiated energy hits an object such as a wall at a surface rather than at a point. As a result, currents may be induced at the surface, which currents re-radiate. The nature of the surface (i.e., its material and geometry) determines the surface currents. A direction of the re-radiated energy, and information about the new signal characteristics (e.g., polarization state, signal strength, signal amplitude), is detected. For example, a vertically-polarized signal may depolarize after reflecting off of a dielectric or inhomogeneous object. It is preferable to predict a degree of polarization or depolarization based on a library of facets (discussed further below), each of which has a particular material composition and inhomogenuity, so that when an incident signal strikes a certain facet at a particular polarization, the polarization state of the reflected signal may be known or selected. Such a technique and/or library is commonly referred to as a polarometric scattering matrix.

Alternatively, attenuation of a signal such as signal 28 may be deterministically predicted using the well-known method of images, or the well-known dot product method. A detailed description of the method of images may be found in U.S. patent application Ser. Nos. 08/701,257, and 08/685,344, commonly assigned with the present invention and U.S. Pat. Nos. 5,831,874 and 5,828,960. Each of the above-referenced U.S. patent applications and Patents is incorporated herein by reference.

A second technique for predicting the characteristic of signal 28 is a statistical/empirical technique, which preferably involves the use of numerical methods. Examples of numerical methods include FDTD, finite element methods (FEM) or the method of moments (MOM). The results of the numerical methods may be pre-calculated and stored in a library, database, table or the like. For example, a library of diffraction coefficients for different kinds of building corners may be created and chosen by a user, or if there is no detailed building information available, diffraction coefficients associated with typical inhomogeneous wedges may be selected. A scattering matrix having row and/or elements such as Fresnel coefficients may be used for three-dimensional type of problems.

Next, at block 510, a process begins which automatically determines the signal characteristic(s) of interest at the selected area(s) of interest.

At block 512, it is shown that the size of the area of interest selected determines the resolution at which the selected signal characteristics are calculated. For example, if the area of interest is ten meters square, the rectangular coordinates of this area of interest are identified. This area of interest may be broken down into the smallest possible individual regions if a high degree of resolution is desired, or may be treated as one complete region if a lower degree of resolution is desired. In general, smaller areas of interest will provide a higher resolution output while larger areas of interest will provide a lower resolution output.

Figure 4:
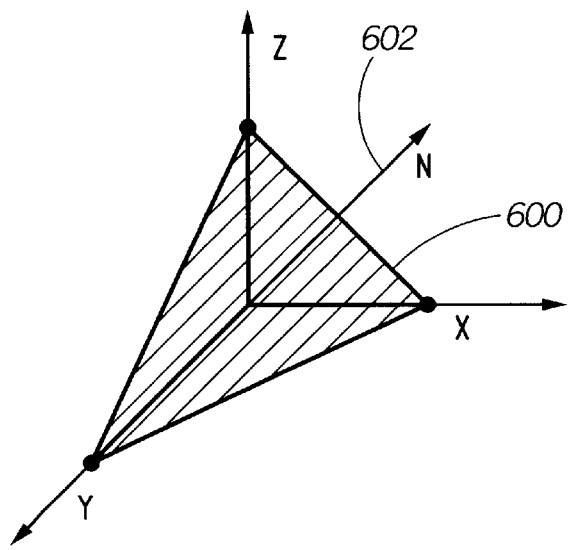
FIG. 4 is a graphical representation of a facet which may represent a portion of the environmental model shown in FIG. 3.

Each area of interest is preferably represented by one or more facets. A facet 600, as shown in FIG. 4, is a plane determined and bounded by three or more points in three-dimensional space, and is an object well-known in the field of computer science. Facet 600 may be triangular or rectangular. A vector N 602 normal to the plane of facet 600 is also shown. A single area of interest may contain one or more facets of varying sizes. A library of facets is preferably created, so that each facet has a particular material composition and inhomogenuity at a particular angle of incidence.

Facets 600 preferably vary in size according to the resolution at which selected signal characteristics are calculated and may also vary in size according to the importance of the location of the facet. For example, areas on or near major roads or buildings may be deemed more important, and therefore have more and smaller facets associated therewith, than unpopulated areas such as fields or lakes. In addition, facets are preferably sized based on geographical features such as land cover and elevation, as discussed above. For example, in a forested area facet size may be different (e.g., larger) than in an urban area. Each facet will have its own reflection coefficient and/or scattering diffusion coefficient.

According to the preferred embodiment of the present invention, a technique for predicting the selected signal characteristic at a particular area of interest is automatically, or adaptively, utilized based on the size of the facet or facets defining the particular area of interest, relative to the frequency of the signal being studied. For example, it is well-known that if a signal has a wavelength which is equivalent or greater than the radius of a surface of a facet, the technique of geometrical optics may not accurately predict characteristics of that signal. In that case, a numerical method technique such as FDTD may be used. Conversely, when a wavelength of a signal is much less than the size of a facet, the technique of geometrical optics may be successfully employed.

A technique for predicting the selected signal characteristic at a particular area may also be based upon the material defined by a particular facet or portion thereof, and/or a location of a particular facet. For example, various levels of irregularities of a material or terrain may be defined, and for irregularities of a particular size, either deterministic models or statistical methods may be used to predict signal characteristics.

Thus, as shown in FIG. 2, the facet's size, physical characteristics and location are determined at block 514 and a prediction technique is selected at block 516.

The signal characteristic is predicted at block 518. The result of the prediction may be displayed graphically in three-dimensions, graphically in two-dimensions, in table format or in any other suitable fashion.

Adapting the manner of predicting signal characteristics according signal frequency and according to facet size and material associated with the area of interest provides many benefits. For example, a single uniform coordinate system, and a single environmental model, may be used to predict the propagation of electromagnetic fields in environments associated with both macrocells and microcells—what is flat at 890 MHz may not appear flat at 1.9 GHz.

As shown at block 520, it may be desirable to modify a parameter associated with the wireless communication system based on the prediction of a signal characteristic. Examples of parameters which may be modified include, among other things, locations of base stations 312, 314 and 316, one or more transmit power values associated with antennae 19 of base stations 312, 314 and 316 and particular frequencies of signals transmitted by antennae 19.

In this manner, it is possible to automatically predict signal characteristics at various points within geographic area 400 associated with wireless communication system 200. Combinations of base station and/or antennae locations, frequencies and signal powers which most fully cover service areas 412, 414 and 416 with the least propagation into neighboring service areas at any given point 11 may be selected.

Figure 5:
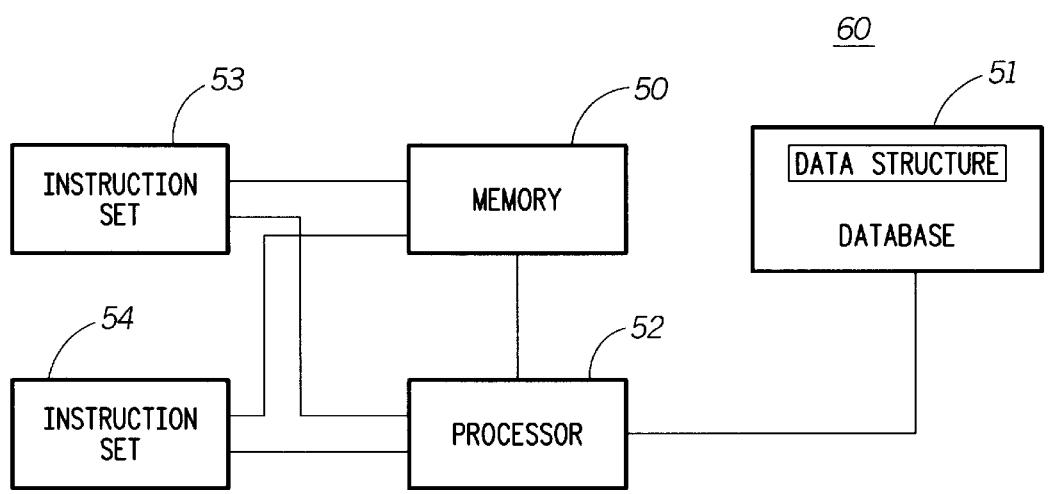
FIG. 5 is a block diagram of an apparatus for predicting signal characteristics in accordance with a preferred embodiment of the present invention.

Referring to FIG. 5, and also to FIGS. 1–4 as appropriate, an apparatus 60, which may be, for example, a general purpose computer, for predicting signal characteristics in accordance with a preferred embodiment of the present invention, is illustrated. A memory 50 stores information representing geographic locations of signal transmission sources such as base stations 312, 314 and 316 and types of antennae 19 along with various transmission frequencies and/or powers. A database 51 responsive to memory 50 stores a number of data structures representing the environmental model, or map, of geographic area 400. Data may be represented in memory 50 and/or database 51 in a variety of well-known ways, for example, using mathematical expressions, data structures, digital representations or tables, for example. The environmental model may have a specific coordinate system (not shown), with individual areas of the system having one or more facets 600 of varying sizes associated therewith. A predetermined space may be represented by three-dimensional facets of varying sizes using well-known computer science techniques.

A processor 52 is in communication with memory 50 and database 51. Processor 52 may be responsive to a program (not shown), which may reside in memory 50 and which may be, for example, an instruction set written using well-known methods in a computer-readable language, which executes the various aspects of the method described in connection with the preferred embodiment(s) of the present invention. For example, the method may be implemented in software, written in a language such as C and/or C++ and performed on a high-performance workstation with one or more microprocessors using serial or parallel processing techniques. The program, in conjunction with processor 52, memory 50 and database 51, may, based on the size of the facet or facets defining a particular area of interest, utilize either instruction set 53 or instruction set 54 to predict the selected signal characteristic at the particular area of interest.

Of course, apparatus 60 may include one or more other devices or elements, such as a keyboard (not shown), a pointing device (not shown) a display device (not shown), or a network interface (not shown).

Memory 50, processor 52 and its associated program, database 51 and instruction sets 53 and 54 may be components of, or implemented within, a simulation tool such as Motorola's Netplan™ software tool. Various aspects of the present invention pertain to specific functions implementable on computer systems in general. And a program implementing the specific functions may be delivered to a computer in many forms, including but not limited to permanent storage on a non-writable storage medium, alterable storage on a writable storage medium, or conveyed through communication media such as a computer network, the public switched telephone network, a fiber optic cable, or transmitted radio frequency signals.

The principles of the present invention which apply to cellular-based communication systems may also apply to other types of communication systems, including but not limited to personal communication systems, satellite communication systems and data networks, and further apply to cellular communication systems having any number of cells. Likewise, the principles described herein are applicable whether the communication systems are analog or digital, one-directional or two-directional. And it will be understood that a communication system, and network elements therein, in which the aspects of the present invention may be used, may be configured in any suitable manner. The various embodiments of the present invention may be used in connection with communication signals having any frequency and with communication systems following any air interface standard.

It will be apparent that other and further forms of the invention may be devised without departing from the spirit and scope of the appended claims and their equivalents, and it will be understood that this invention is not to be limited in any manner to the specific embodiments described above, but will only be governed by the following claims and their equivalents.

We claim:

1. In a wireless communication system serving a geographic area, the wireless communication system including a first transmitter and a second transmitter, the first transmitter a microcellular transmitter configured to transmit a first signal having a first wavelength and the second transmitter a macrocellular transmitter configured to transmit a second signal having a second wavelength, a method for predicting a characteristic of the first and second signals at a predetermined location within the geographic area, the method comprising the steps of:

positioning representations of the first and second transmitters;

defining an environmental model of the geographic area;

defining a plurality of facets within the environmental model, each of the plurality of facets comprising at least three points defining a plane and having a size, at least one facet associated with the predetermined location;

providing a first technique for predicting the characteristic;

providing a second technique for predicting the characteristic;

based on the size of the at least one facet associated with the predetermined location, the first wavelength and the second wavelength, using one of the first technique and the second technique to predict the characteristic at the predetermined location; and based on the prediction, modifying a parameter associated with the wireless communication system.

2. The method according to claim 1, wherein the wireless communication system comprises a cellular radiotelephone communication system.

3. The method according to claim 2, wherein the cellular radiotelephone communication system is selected from the group consisting of: a code division multiple access (CDMA) system, an analog system and a time division multiple access (TDMA) system.

4. The method according to claim 1, wherein the predetermined location comprises a three-dimensional area.

5. The method according to claim 1, wherein the environmental model comprises a map.

6. The method according to claim 5, wherein the map comprises a database.

7. The method according to claim 6, wherein the database comprises representations of terrain data and representations of clutter data integrated into a single data set.

8. The method according to claim 7, wherein the clutter data comprises three-dimensional buildings.

9. The method according to claim 1, wherein each of the plurality of facets further comprises a vector normal to the plane.

10. The method according to claim 1, further comprising the step of:

assigning a priority value to each of the plurality of facets.

11. The method according to claim 10, wherein the priority value assigned each of the plurality of facets is based on one of a location of the facet within the geographic area and traffic density.

12. The method according to claim 11, wherein the size of each of the plurality of facets is based on the assigned priority value.

13. The method according to claim 1, wherein the first technique comprises three-dimensional geometrical optics.

14. The method according to claim 1, wherein the second technique comprises a numerical method.

15. The method according to claim 14, wherein the numerical method comprises finite difference time domain (FDTD).

16. The method according to claim 1, wherein the step of using one of the first technique and the second technique further comprises the steps of:

using the first technique if the wavelength is greater than the size of the at least one facet associated with the predetermined location; and using the second technique if the wavelength is less than or equal to the size of the at least one facet associated with the predetermined location.

17. The method according to claim 16, wherein the size of the at least one facet comprises a radius of the at least one facet.

18. The method according to claim 1, wherein the characteristic is selected from the group consisting of: signal strength, signal interference, signal polarization, signal propagation path and signal coverage area.

19. The method according to claim 1, wherein the parameter is selected from the group consisting of: channel power, channel reuse plan, antenna type, and location of the first and second transmitters.

20. In a wireless communication system serving a geographic area, the wireless communication system including a first transmitter and a second transmitter, the first transmitter a microcellular transmitter configured to transmit a first signal and the second transmitter a macrocellular transmitter configured to transmit a second signal, an apparatus for determining a characteristic of the first and second signals at a predetermined location within the geographic area, the apparatus comprising:

means for positioning representations of the first and second transmitters;

means for defining an environmental model of the geographic area;

means for defining a plurality of facets within the environmental model, each of the plurality of facets comprising at least three points defining a plane and having a size, at least one facet associated with the predetermined location;

first means for predicting the characteristic;

second means for predicting the characteristic; and means for selecting one of the first means for predicting and the second means for predicting to determine the characteristic at the predetermined location, the selection based on the size of the at least one facet associated with the predetermined location and based on a wavelength of the first and second signals.

* * * * *